May 19, 1970 F. WELTY Re. 26,880

DEVICE FOR CONTROLLING THE RATE OF FLOW OF FLUIDS

Original Filed March 23, 1965

INVENTOR.
FRANK WELTY

BY Francis J. Klempay
ATTORNEY

United States Patent Office

Re. 26,880
Reissued May 19, 1970

26,880

DEVICE FOR CONTROLLING THE RATE OF FLOW OF FLUIDS

Frank Welty, 4962 Lockwood Blvd.,
Youngstown, Ohio 44511

Original No. 3,351,087, dated Nov. 7, 1967, Ser. No. 442,054, Mar. 23, 1965. Application for reissue June 24, 1968, Ser. No. 748,576
Int. Cl. F16k *17/30*
U.S. Cl. 137—504 6 Claims

Matter enclosed in heavy brackets [ ] appears in the original patent but forms no part of this reissue specification; matter printed in italics indicates the additions made by reissue.

*ABSTRACT OF THE DISCLOSURE*

*A device for controlling the rate of flow of fluids under varying pressure and having a biased valving element controlling the flow of fluid therethrough, the fluid path through said device arranged to effect differential control pressures on the opposite sides of said valving element.*

This invention relates to an improved device for controlling the rate of flow of fluids, both liquids and gases, and more particularly to an improved device for this purpose which very accurately compensates for variations in pressure of the fluid source. Devices of this nature have heretofore been commonly termed flow control valves, and a wide variety of mechanical arrangements have heretofore been proposed to effect the required compensation for incoming pressure variations and thus to effect a consistently uniform quantity of fluid flow per unit of time. The devices of the prior art, however, have objectionable characteristics as regards consistency of control, oversensitivity, inability to make practical adjustments for changes in the rate of flow, and as regards humming or resonant operation whereby there is objectionable noise and the biasing springs commonly used are short lived. The present invention overcomes these difficulties by the use of a novel valving and mechanical arrangement whereby the primary actuation of the controlling valve is effected by a balancing of pressures and inertia in the fluid being handled, the biasing spring being utilized only to predetermine the operating range of the counter-balancing fluid pressure and inertia.

Another object of the invention is the provision in a device of the kind outlined above an improved arrangement for valving the discharge of the fluid from the device so that all dynamic effect of such discharge is remote from the actuation of the controlling valve. This lends consistency to the functioning of the control device and as will become apparent later effectively eliminates hunting and humming and permits of a more precise biasing control to be applied to the valve.

A further object of the invention is the provision of a flow control valve of the general kind outlined above of an arrangement for effectively cushioning the actuation of the control valve as it approaches a fully-closed position and as it leaves such position in an opening direction. This is accomplished by fluid dynamic forces the elasticity of which contributes to the quiet, smooth functioning of the device and interconnected conduits and valves in a complete system with which the flow control device is used.

The above and other objects and advantages of the invention will become apparent upon consideration of the following specification and the accompanying drawing wherein there is disclosed a preferred embodiment of the invention.

Figure 1:
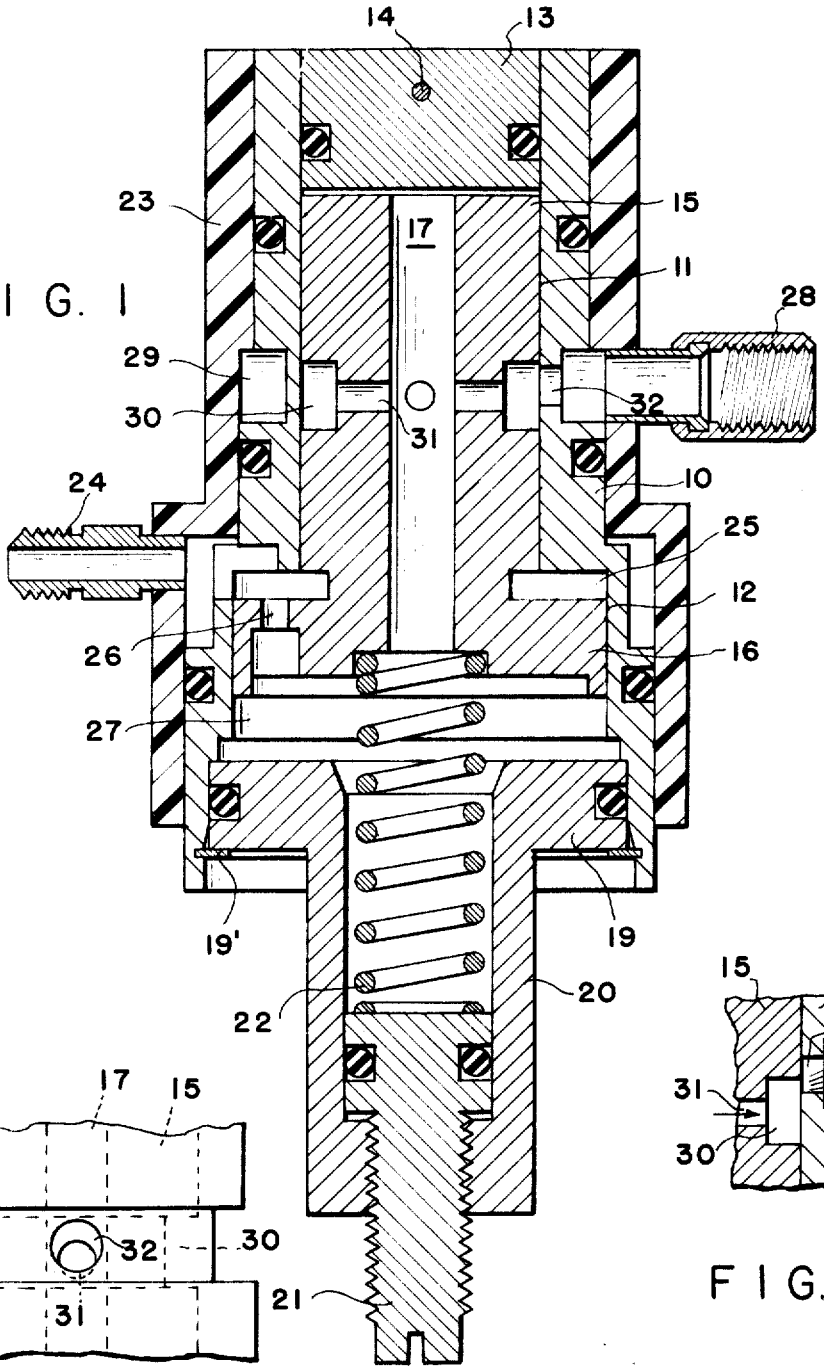
FIGURE 1 is a longitudinal section through a fluid flow control device constructed in accordance with the principles of the invention.

In the drawing, reference numeral 10 designates a generally cylindrical body or housing having a first bore 11 at one end and an axially connected larger bore 12 at its other end. The free end extremity of the bore 11 is closed off by a plug 13 held in position by a transverse pin 14, and suitable O-ring sealing means as illustrated may be employed to prevent leakage. Slideably received in the body 10 is a valving element comprised of a plunger 15 received in bore 11 and a piston 16 received in bore 12. The plunger 15 and piston 16 are preferably made integral and this assembly has a longitudinal thru-bore 17.

Closing off the bottom end of the member 10 is a sealed fitting 19 which is held in place by readily removable spring rings 19' and which has an integral downwardly extending hollow boss 20. Screw-threadedly received in the bottom wall of the boss 20 and sealed with relation thereto as by means of the O-ring illustrated is the adjusting screw 21. Interposed between this adjusting screw 21 and the bottom end of the piston 16 is a light coil spring 22 which serves to keep an upward bias on the piston 16 and consequently on the plunger 15.

Enclosing substantially the whole of the outer wall of the housing 10 is a tubular casing 23 which may be formed of decorative plastic material or highly finished to present a pleasing appearance. An inlet fitting 24 is secured to the side wall of the casing 23 and provides an inlet passage to an annular space 25 which is on the top side of the piston 16. Leading downwardly from this space 25 and extending effectively and axially through the piston 16 is a short, sharp orifice 26. During operation of the control device the downward flow of fluid through the orifice 26 discharges into a space 27 which is on the bottom side of the piston 16 and it should be noted that this space 27 is in open communication with the bottom end of the thru-bore 17.

Also mounted on the casing 23 at a point intermediate the ends of the bore 11 is an outlet fitting 28 which communicates with an annular groove 29 formed in the outer surface of the housing 10. A similar groove 30 is formed at about the same axial location in the plunger 15, and radial passages 31 formed in the plunger provides communication between the bore 17 therein and the groove 30 while other radial passages 32 formed in the housing 10 provides communication between the groove 30 and the groove 29 leading to the outlet fitting 28.

It should be noted that the upper radial wall of the groove 30 cooperates with the radial passages 32 to throttle the outlet of fluid from the device, and throughout this specification these cooperating components will be sometimes referred to as a valve or valve means. The arrangement is such that as the plunger 15 moves downwardly this valve or valve means will be progressively closed against the action of the spring 22 which in such case will be progressively compressed. It should also be noted that in the absence of any fluid dynamic forces as when the conduit (not shown) leading from the fitting 28 is shut off the spring 22 acts to move the piston and plunger assembly to full upward position wherein the valve is fully opened. This condition prevails regardless of the fluid pressure existent at the inlet 24. It should also be noted that the piston and plunger assembly is completely engulfed in fluid, a factor which becomes of considerable importance in achieving the optimum characteristics of the device of the invention as will be more fully explained below.

Considering now the operation of the device described above, it is well initially to bear in mind that for any given orifice carrying flowing fluids the pressure drop between the inlet and outlet ends thereof is a function at the rate of flow of the fluid. The greater the rate of flow the greater the pressure drop, and assuming at the outset that the fluid is permitted to flow through the device against a low pressure existent at the outlet fitting 28 it will be understood that an increase in fluid pressure at the inlet 24 will raise the pressure drop across the orifice 26 causing the piston and plunger assembly to move downwardly against the action of the spring 22 thereby further throttling the valve 30, 32. If the applied inlet pressure should drop there will be less pressure differential between spaces 25 and 27 and the spring will operate to raise the plunger and open the valve further. In this manner the device of this invention operates to consistently deliver or pass a uniform quantity of fluid per unit of time regardless of the variation in the pressure of the fluid source 24.

Because both axial ends of the moving assembly comprised of the plunger 15 and piston 16 are always engulfed in fluid, it will be understood that this assembly is inherently damped and cushioned at both ends so that it moves rather slowly from one position of adjustment to the other and is incapable of hunting or rapid oscillation or humming. Further, since the fluid pressure at the upper axial end of the plunger 15 is effectively almost opposed by the fluid pressure existent in the space 27 a near-balance is achieved which makes not only for sensitivity but also efficiency in the function of the orifice 26 since lower differentials and force is required to be generated to throttle the valve. However, by judicious selection of areas in the detailed design of the device it is possible to avoid criticalness in the adjustment of the screw 21—i.e. permitting this screw to be rotated a full turn for example, in making only a very slight change in the rate of flow of fluid through the device. Further, the adjustment once made is stable to a high degree due probably to the balanced and cushioned nature of the valve plunger and the lack of any resonant motion of any of the moving parts.

Figure 3:
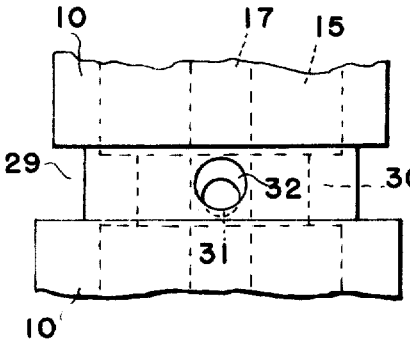
FIGURE 3 is a side elevation of the parts shown in FIGURE 2.

By referring to FIGURE 3 of the drawing it will be observed that the geometry of the upper annular surface of the groove 29 in relation to the apertures 32 is such that during an intermediate range of movement of the plunger 15 the outlet passages through apertures 32 will be greatly increased for small increments of movement whereas when the valve approaches cutoff the effect on the outlet passage will be less for any increment of movement of the plunger. This is highly advantageous because it reduces the criticalness of the valving allowing fluid pressure to build up rapidly at the upper end of the plunger 15 in conformity with the pressure existent at the lower end of the plunger whereby the spring 22 acts as aforesaid to raise the piston and plunger and thus reestablish the desired rate of flow of fluid through the device. Thus, while sensitivity and quick response is retained there is no rapid vibration or humming which is a defect in prior art devices of which I am aware.

Since the plunger 15 is balanced by fluid pressure at either end the device operates uniformly and consistently regardless of the downstream back pressure which may be applied to the fitting 28. The only force tending to throttle the valve 30, 32 against the action of the spring of that peripheral portion of the piston 16 which is radially outward of the cylindrical projection of the bore 11. This makes for a sensitivity of the control but nevertheless reduces the criticalness of the adjustment of the screw 21. The device is easy to set for any rate of flow within its capacity and when once the adjustment is made the same remains stable.

Figure 2:
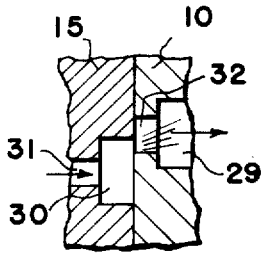
FIGURE 2 is a fragmentary view, on an enlarged scale, of a portion of the outlet control valve of FIGURE 1.

The device of the invention is intended to operate under widely varying back pressures with the rate of flow being determined solely by the pressure drop developed across orifice 26 which is balanced against the adjusted assertion of the spring 22. The ultimate control is, of course, effected by the opening and closing of the valve ports 32. When the rate of flow of the fluid tends to become too great, as caused by an increase or surge of pressure at the inlet 24, the heavier pressure build-up on the upper surface of the piston 16 moves the plunger 15 downwardly to throttle the valve ports 32. Obviously, under this condition, there is an increase in the velocity of the fluid escaping through the ports 32. Regardless of the nature of the fluid being handled, whether liquid or gas, the impingement of a rapidly moving stream thereof on a movable sensitive control element will adversely effect said element due to inertia or dynamic effects. Various devices of the prior art of which I am aware have this defect, and the same is accordingly corrected in the structure of this invention wherein it will be noted, from FIGURE 2, that the discharge from the valving ports 32 is outwardly into the large annular chamber provided by the groove 29. All kinetic energy in the rapidly moving fluid is thus dissipated without having any effect whatever on the balance or operation of the movable parts of the valve.

Another advantage of the arrangement of the invention is that as and when the valve ports 32 approach closed condition the resultant increase in velocity of the fluid escaping through them creates an internal build-up in fluid pressure about the adjacent edge portions of the upper annular end of the groove 29 and the lower portions of the apertures 32 whereby there is a tendency to cushion the full closing movement of the plunger 15. This is a further contribution to the characteristics which eliminate chatter, hum, and erratic operation of the device. Among other such characteristics are the inertia of the combined plunger 15 and piston 16 and the fluid cushioning of both the plunger and the piston as explained above. In actual practice the device of the invention as shown results as to accuracy and consistency vastly improved over the performance of many prior art devices tested.

In the practical application of the principles of the invention the diameter of the thru-bore 17 is related to the nature of the fluid to be handled particularly as regards the tendency of the fluid when flowing longitudinally through the bore 17 to apply an elastic axial force to the plunger 15. It should be noted that this force is in opposition to the elastic force applied to the plunger by the piston 16. Accordingly, abrupt changes or surges in operation are thus further effectively inherently damped by the skin friction effect of the fluid pulsing longitudinally through the bore 17. The balancing of these forces makes for sensitivity of operation without adding over-criticalness to the manual adjustment of the device.

While I have shown and described the controlling orifice 26 as extending axially through the piston 16, it should be apparent that this orifice may be located in other positions [as, for example, directly in the side wall of the plunger 15. In such case, the outlet of the orifice would be to the bore 17 with the orifice outlet pressure being conducted to the underside of the piston 16. However, the pressure at the inlet of the orifice would be applied, as in the illustrated embodiment, to the upper side of the piston so that the piston would still be acted on by the differential pressure across the orifice].

[Since, as explained above, various changes may be made in the specific arrangement and proportions of the essential components of the device of the invention, reference should be had to the appended claims in determining the scope of the invention.]

Having thus described my invention, what I claim is:

1. A device for passing a predetermined quantity of fluid per unit of time regardless of variations in the pressure of the fluid source comprising: a housing having coaxial and adjacent bores therein of different diameters, a combined valve plunger and piston slideably received in said bores with the piston in the larger of said bores, means to conduct fluid from the source to the side of said piston which is toward said plunger, means closing off the outer open ends of said bores, an orifice in said combined valve plunger and piston operative to conduct fluid from said source to a thru-bore in said piston and plunger whereby fluid coming through said orifice is conducted to the outer end of said plunger, as well as to the other side of said piston, a valve having a discharge port in the side wall of said housing and a cooperating recess in said plunger communicating with said thru-bore, and resilient yieldable means biasing said piston and plunger assembly against the axial force exerted by said piston by reason of the pressure drop through said orifice.

2. A device for passing a predetermined quantity of fluid per unit of time regardless of variations in the pressure of the fluid source comprising: housing structure having coaxial and adjacent bores therein of different diameters, a valve plunger and a piston slideably received in said bores with the piston in the larger of said bores, means on the structure to conduct fluid from the source to a first space within the structure on the side of said piston which is toward said plunger, means closing off the outer open ends of said bores, an orifice in said piston and communicating said first space with a second space in the structure on the side of the piston opposite said plunger, said piston and plunger being provided with a bore therethrough and located to intercommunicate said second space with the internal area of the structure at the outer end of said plunger away from said piston, means defining a discharge port in the side wall of said housing, said plunger being provided with a passage communicating said thru-bore with the port, and resilient yieldable means on the structure biasing said piston and plunger assembly toward said area against the axial force exerted on said piston within said first space by reason of the pressure drop through said orifice.

3. A device according to claim 2 further characterized in that the means defining said discharge port presents a round aperture the central axis of which is at right angles to the direction of movement to said plunger, said structure is provided with an annular groove therein aligned with said port, and a discharge fitting on the structure and communicating with said groove.

4. A device according to claim 3, wherein said plunger is provided with an outer, circumferentially extending annular groove aligned with said passage for communicating the latter with said port and having an inwardly extending annular surface disposed to slide across said aperture during shifting of said plunger.

5. A device for passing a predetermined quantity of fluid per unit of time regardless of variations in the pressure of the fluid source comprising: a housing having inlet and outlet openings therein and said housing providing a passage for the fluid between said inlet and outlet openings, a valve assembly in said housing having an outlet port communicating directly with said outlet opening, a sliding member within the housing and having a passage movable across said port to throttle the opening presented thereby depending upon the extent of communication of the passage with the port, spring means in said housing to bias the movement of said sliding member in one direction, and piston means in said housing dividing the latter into opposed spaces with the space adjacent said member communicating with said inlet, said piston being provided with an orifice therethrough intercommunicating said spaces and constituting part of the fluid passage through said housing to bias the movement of said sliding member in the opposite direction in accordance with the instantaneous pressure difference developed on opposite sides of said piston means, and said piston and the sliding member having a bore extending axially therethrough intercommunicating the housing at opposite ends of the piston and member and communicating with said passage.

*6. A device for passing a predetermined quantity of fluid per unit of time regardless of variations in the pressure of the fluid source and/or the forces resulting from the kinetic energy created through momentum comprising a valve housing having spaced inlet and outlet ports and a valving element movably in said housing for controlling the flow of fluid between said inlet and outlet ports, said valving element having unlike opposed areas, one of said areas being arranged so that pressure thereon urges said valve member in a first direction and the other of said areas being arranged so that pressure thereon urges said valve member in a second opposite direction, means to conduct fluid from said source to one of said areas to create a force on said area of said valving element and to the other area of said valving element to crete an opposing and differential force thereon, said valving element having a bore therethrough extending from said other area toward said outlet, said valve housing having outlet means therein positioned so that flow of fluid in said bore is in said second opposite direction, the flow of fluid through the bore applying an elastic force on the valving element in opposition to the force of fluid against said one area, a connecting path between the opposed areas, said connecting path including an orifice creating a pressure drop.*

References Cited

The following references, cited by the Examiner, are of record in the patented file of this patent or the original patent.

UNITED STATES PATENTS

| | | | |
|---|---|---|---|
| 1,933,852 | 11/1933 | Hahn. | |
| 2,865,397 | 12/1958 | Chenault | 137—501 X |
| 2,888,949 | 6/1959 | Evans. | |
| 3,112,764 | 12/1963 | Anderson et al. | |
| 3,170,481 | 2/1965 | Presnell. | |

ARNOLD ROSENTHAL, Primary Examiner